United States Patent Office 3,169,151
Patented Feb. 9, 1965

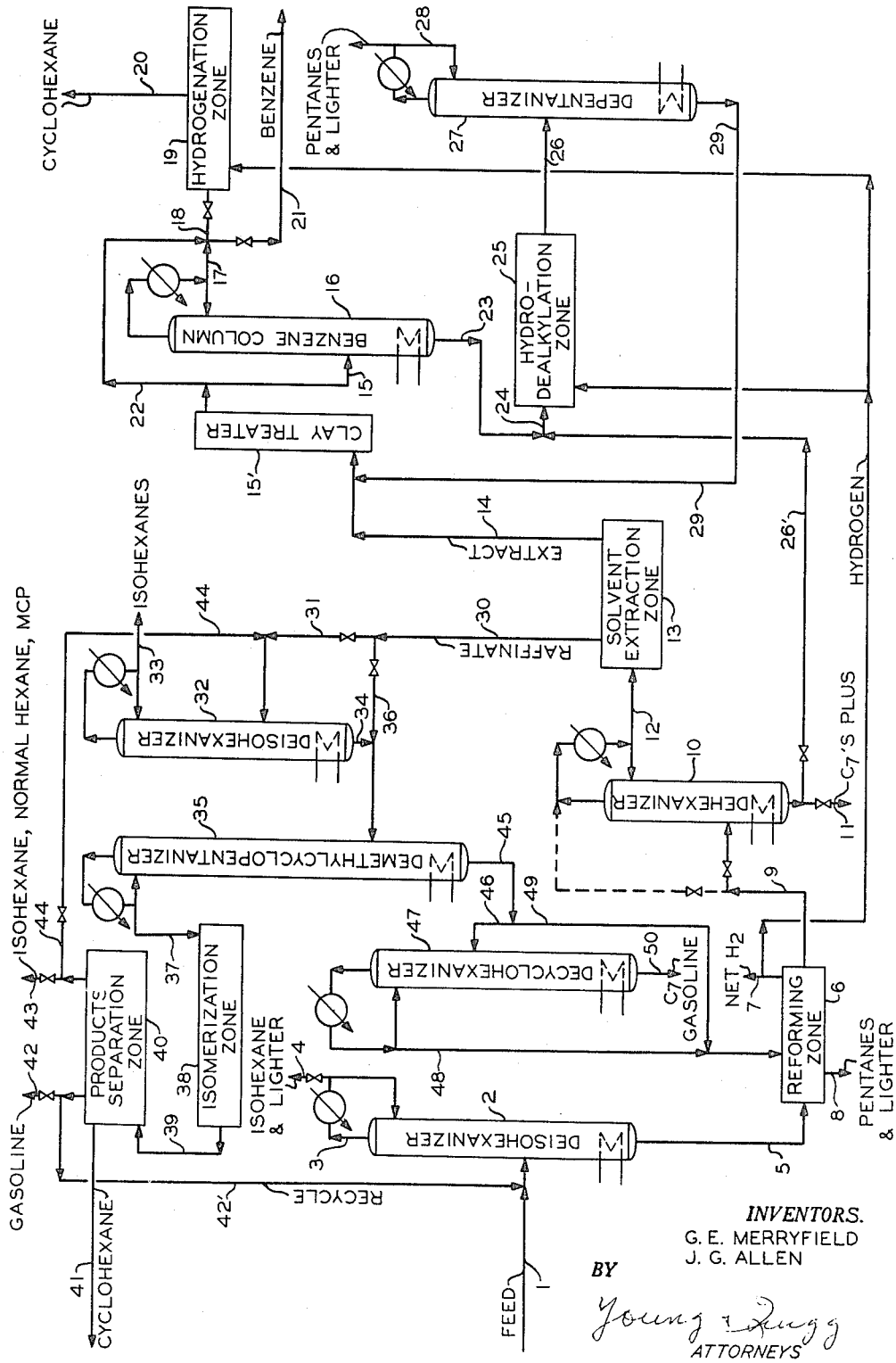

3,169,151
UP-GRADING A HYDROCARBON STREAM TO PRODUCE HIGH PURITY CYCLOHEXANE AND BENZENE
George E. Merryfield and John G. Allen, Bartlesville, Okla., assignors to Phillips Petroleum Company, a corporation of Delaware
Filed Sept. 19, 1961, Ser. No. 139,115
10 Claims. (Cl. 260—667)

This invention relates to a process and apparatus for up-grading hydrocarbon mixtures. In one of its aspects, it relates to a novel combination of steps comprising reforming, fractionation, solvent extraction, hydrogenation, and isomerization. In another aspect, the invention relates to a process and apparatus for up-grading hydrocarbons which comprises reforming a hydrocarbon mixture to produce a stream comprising paraffins, naphthenes, and aromatics; separating this reformed stream by solvent extraction to produce an extract stream comprising aromatics and a raffinate stream comprising paraffins and naphthenes; withdrawing one portion of the extract stream as a high-purity benzene product; hydrogenating another portion of the extract stream to produce a high-purity cyclohexane product; fractionating the raffinate stream to produce a stream comprising methylcyclopentane and lighter and a stream comprising cyclohexane; returning at least a portion of the latter cyclohexane stream to the process feed; isomerizing the stream comprising methylcyclopentane and lighter; and separating from the resulting isomerizate a high-purity cyclohexane product. In still another aspect, the invention relates to process and apparatus for producing benzene and cyclohexane from commonly available refinery streams.

Because of the rapid and relatively recent growth of the petrochemical industry, demand for certain bulk chemicals of relatively high purity has increased to the point where it is more economically attractive to produce these chemicals than others which were in former demand. Among these chemicals of present demand are benzene, toluene, and cyclohexane. As known to the art, these chemicals are valuable for example as solvents, reaction media, and polymer starting materials. There is a substantial need in the art for processes and apparatus suitable for producing increasing quantities of these named chemicals from commonly available refinery streams.

Accordingly, it is an object of this invention to provide process and apparatus for producing quantities of benzene and cyclohexane. It is another object of this invention to provide a novel combination of steps whereby commonly available refinery streams can be processed to produce increased quantities of relatively high-purity benzene and cyclohexane.

Other aspects, objects and the several advantages of the invention will become apparent to one skilled in the art upon study of this disclosure, drawing and appended claims.

According to our invention there is provided a process and apparatus for up-grading hydrocarbons which comprises reforming a hydrocarbon mixture to produce a stream comprising paraffins, naphthenes, and aromatics; separating the reformed stream by solvent extraction to produce an extract stream comprising aromatics and a raffinate stream comprising paraffins and naphthenes; withdrawing one portion of the extract stream as a high-purity benzene product; hydrogenating a second portion of the extract stream to produce a high-purity cyclohexane product; fractionating the raffinate stream to produce a stream comprising methylcyclopentane and lighter and a stream comprising cyclohexane; returning at least a portion of the cyclohexane stream to the feed mixture; isomerizing the stream comprising methylcyclopentane and lighter; and separating from the resulting isomerizate a high-purity cyclohexane product. In one embodiment of our invention, the extract is fractionated to produce a high-purity benzene stream overhead, a portion of which is hydrogenated as previously described. Kettle product of this benzene fractionation is subjected to hydrodealkylation and further fractionation to produce overhead a pentanes and lighter product stream and as kettle product a hexanes stream which is returned to the feed of the benzene column. In another embodiment of our invention, the reformate is subjected to fractionation prior to solvent extraction to produce overhead a hexane and lighter stream which is solvent extracted as described, and as kettle product a heptanes and heavier stream, a portion of which can be admixed with the hydrodealkylation feed previously described. In another embodiment of our invention, the raffinate can, prior to being fractionated to produce the stream comprising methylcyclopentane and lighter, be subjected to fractionation to remove therefrom an isohexane-containing stream.

For a more complete understanding of our invention, reference is now made to the accompanying drawing which represents in schematic detail a presently-preferred form of our invention.

Referring now to the drawing, a feed, which can comprise a mixture of iso- and normal-hexanes, methylcyclopentane, cyclohexane, and iso- and normal-heptanes, is passed by way of conduit 1 to a fractionation column 2. Isohexane and lighter are passed overhead by way of conduit 3 and its associated reflux condenser, and a portion can be removed by way of conduit 4 and its associated valve as a product of the process. The kettle product, comprising normal-hexane and heavier, is passed by way of conduit 5 to a reforming zone 6. This reforming results primarily in conversion of cyclohexane and methylcyclopentane to benzene, and produces net hydrogen. The net hydrogen is removed by way of conduit 7 and can be utilized later in the process. Small amounts of pentanes or butanes and lighter are removed by way of conduit 8. The resulting reformate is passed by way of conduit 9 to fractionation column 10. In this column, heptanes and heavier comprise the kettle product, a portion of which can be removed by way of conduit 11 and its associated valve and can be utilized, for example, as a gasoline blending stock. Overhead comprising normal hexane, isohexanes, benzene, cyclohexane, and MCP product is passed by way of conduit 12 to a solvent extraction zone 13. The stream is here separated into an aromatic extract and a paraffin and naphthene-containing raffinate. The aromatic extract, comprising high-purity benzene, can be passed by way of conduit 14 and conduit 15 with its associated valve to a benzene column 16 by way of clay treater 15′. Overhead product of this column is passed by way of conduit 17, and a portion is passed by way of conduit 18 and its associated valve to a hydrogenation zone 19. In this zone, the benzene is hydrogenated, as for example, with hydrogen from conduit 7, to produce a high-purity cyclohexane product removed by way of conduit 20. A second portion of the overhead stream is removed directly by way of conduit 21 and its associated valve as a high-purity benzene product. Alternatively, the aromatic extract can be passed directly by way of conduit 22 to conduit 17. Kettle product comprising toluene from benzene column 16 is passed by way of conduits 23 and 24 to a hydrodealkylation zone 25. A portion of the bottoms from dehexanizer column 10 can also be passed by way of conduit 26' and its associated valve to this hydrodealkylation zone. The hydrodealkylated effluent is passed by way of conduit 26 to a depentanizer column 27. Pentanes and lighter are removed overhead by way of conduit 28 as a product of the process, and the kettle product is passed by way of conduit 29 to conduit 15 wherein it is again clay treated and then fractionated in the benzene column 16.

The raffinate stream from solvent extraction zone 13 comprising paraffins and naphthenes is passed by way of conduit 30 and conduit 31 and its associated valve to a deisohexanizer column 32. An isohexane product is removed overhead by way of conduit 33. Kettle product is removed by way of conduit 34 and passed to fractionation column 35. Alternatively, raffinate can be passed directly by way of conduit 30 and conduit 36 and its associated valve to fractionation column 35. Overhead product of column 35 is passed by way of conduit 37 to an isomerization zone 38. In this zone, normal hexane is isomerized to isohexanes and methylcyclopentane is isomerized to produce cyclohexane, and the isomerizate is passed by way of conduit 39 to a product separation zone 40. A second high-purity cyclohexane product is removed by way of conduit 41, a gasoline stream is removed by way of conduit 42, and a product comprising isohexanes, normal hexane, and MCP is removed by way of conduit 43. This stream 43 can be passed by way of conduit 44 to conduit 31 for further treatment. Gasoline stream 42 containing some cyclohexane can be recycled to tower 2 by way of 42'. Kettle product from column 35 is passed by way of conduit 45 and conduit 46 and its associated valve to fractionation column 47. In this column, cyclohexane and lighter are taken overhead by way of conduit 48 and admixed with the feed to the reforming zone 6. Alternatively, this kettle product from column 35 can be passed directly by way of conduit 49 and its associated valve to the reforming zone 6. Kettle product from column 47 comprising a $C_7$ gasoline cut is removed as a product of the process by way of conduit 50.

Thus, it can be seen that the reforming operation, which processes a common refinery stream, produces the stream rich in paraffins, aromatics, and naphthenes which in turn is separated by solvent extraction to yield an extract of the desired high-purity aromatics and a raffinate which is isomerized to yield, after separation, a desired high-purity naphthene.

The isomerization, hydrogenation, hydrodealkylation, solvent extraction, clay treating, and reforming processes can be any of those known in the prior art which would be chosen by one skilled in the art. For example, the isomerization process can be a catalytic process using HCl-fortified aluminum chloride-hydrocarbon complex; the hydrogenation process can be a catalytic process using a nickel on kieselguhr-type catalyst; hydrodealkylation can be thermal or catalytic (e.g., Hydeal), using a chromia-alumina type catalyst; solvent extraction can be carried out using diethylene or triethylene glycol as the solvent; reforming can be catalytic (e.g., Platforming) using a platinum on alumina type catalyst. These above-mentioned individual processes, per se, are well known in the art.

Feed materials which can be used in our invention include conventionally available refinery hydrocarbon streams comprising methylcyclopentane, benzene, and cyclohexane (along with any normal hexane, isohexanes, $C_7$'s and heaviers in the gasoline boiling range which may be therein).

Example

| | B/D |
|---|---|
| Feed (1) | 13,470 |
| Composition: | |
| Isohexanes | 1,530 |
| Normal hexane | 2,180 |
| Methylcyclopentane | 1,190 |
| Benzene | 330 |
| Cyclohexane | 890 |
| $C_7$'s and heavier | 7,350 |
| | |
| Product Yields: | |
| Isohexanes (4+33+43) | 4,350 |
| $C_7$ and heavier (11+50) | 5,775 |
| Benzene [1] (21) | 1,435 |
| Cyclohexane [2] (20) | 800 |
| Cyclohexane [3] (41) | 1,100 |

[1] 99.9% pure.
[2] 99.5+% pure.
[3] 98% pure.

It is noted that we can vary the quantities of benzene and of cyclohexane to meet market demands.

Reasonable variation and modification are possible within the scope of this disclosure, the appended claims, and the drawing of the invention, the essence of which is that there are provided process and apparatus for upgrading mixed hydrocarbons comprising reforming, solvent extraction of the reformate, separation and hydrogenation of the resulting extract phase to produce high-purity aromatics and naphthenes, and isomerization and fractionation of the raffinate phase to produce additional high-purity naphthenes, along with advantageous recycles of various streams.

We claim:

1. A process for up-grading a hydrocarbon mixture containing $C_6$–$C_7$ hydrocarbons comprising reforming said mixture to produce a stream comprising paraffins, naphthenes, and aromatics including benzene; separating said stream comprising paraffins, naphthenes and aromatics including benzene by solvent extraction to produce an extract stream comprising aromatics and a raffinate stream comprising paraffins and naphthenes; withdrawing a first portion of said extract stream as a high-purity benzene product; hydrogenating a second portion of said extract stream to produce a high-purity cyclohexane product; fractionating said raffinate stream to produce a stream comprising methylcyclopentane and lighter and a stream comprising cyclohexane; returning at least a portion of said stream comprising cyclohexane to said mixture; isomerizing said stream comprising methylcyclopentane and lighter; and separating from the resulting isomerizate a high-purity cyclohexane product.

2. The process of claim 1 wherein there is separated from said mixture containing $C_6$–$C_7$ hydrocarbons, isohexane and lighter prior to said reforming.

3. The process of claim 1 wherein there is separated from said stream comprising paraffins, naphthenes and aromatics including benzene, cyclohexane and heavier prior to said solvent extraction.

4. The process of claim 1 wherein said extract stream is fractionated to produce a lighter portion comprising said first portion and said second portion and a heavier portion, said heavier portion is hydrodealkylated, and said hydrodealkylated heavier portion is fractionated to produce a $C_5$ and lighter containing product stream and a residual stream which is returned to said extract stream.

5. The process of claim 4 wherein said stream comprising paraffins, naphthenes and aromatics including benzene is fractionated, the overhead comprising the feed to said solvent extraction, and at least a portion of the kettle product being admixed with said heavier portion.

6. The process of claim 1 wherein said raffinate stream is fractionated, the overhead comprising an isohexane product and the kettle product comprising the feed to said step of fractionating said raffinate stream.

7. The process of claim 6 wherein a portion of said isomerizate is admixed with said raffinate stream.

8. The process of claim 2 wherein at least a portion of said isohexane and lighter is admixed with the feed to the step of fractionating said raffinate stream.

9. The process of claim 2 wherein at least a portion of said stream comprising cyclohexane is fractionated to produce an overhead product comprising cyclohexane and a kettle product, at least a portion of which overhead product is admixed with the feed to said reforming.

10. A process for up-grading a hydrocarbon mixture containing $C_6$–$C_7$ hydrocarbons which comprises the steps of
   (a) passing said mixture to a first fractionation zone;
   (b) separating said mixture in said first fractionation zone into a stream comprising isohexane and lighter and a stream comprising the remainder of said mixture;
   (c) withdrawing a portion of the first-mentioned stream of step "b" as a product of the process;
   (d) reforming the second-mentioned stream of step "b" to produce a stream comprising paraffins, naphthenes, and aromatics including benzene;
   (e) separating excess hydrogen and butanes and lighter from the stream produced in step "d";
   (f) passing the remainder of the stream produced in step "d" to a second fractionation zone;
   (g) separating in the said fractionation zone of step "f" a stream comprising isohexanes and lighter and a stream comprising the remainder of the feed to said second fractionation zone;
   (h) withdrawing a portion of said remainder of step "g" as a product of the process;
   (i) separating the stream comprising isohexanes and lighter obtained in step "g" by solvent extraction into an extract stream comprising aromatic hydrocarbons and a raffinate stream comprising paraffinic and naphthenic hydrocarbons;
   (j) passing at least a portion of said extract stream of step "i" to a third fractionation zone;
   (k) separating the said portion of step "j" in a third fractionation zone into a stream comprising benzene and a stream comprising toluene;
   (l) hydrogenating a portion of said stream comprising benzene obtained in step "k" to produce a high purity cyclohexane product;
   (m) withdrawing a portion of said stream comprising benzene of step "k" as a high purity benzene product;
   (n) hydrodealkylating said stream comprising toluene of step "k" and separating the hydrodealkylated product into a pentanes and lighter product and a stream comprising the remainder of said hydrodealkylated product;
   (o) admixing said remainder of step "n" with said portion of said extract stream to step "j";
   (p) admixing a second portion of the second-mentioned stream of step "g" with the feed to step "n";
   (q) passing at least a portion of said raffinate stream of step "i" to a fourth fractionation zone;
   (r) separating in the fractionation zone of step "q" the said raffinate into a stream comprising isohexanes and a stream comprising the remainder of said portion of said raffinate stream;
   (s) separating the remainder of step "r" in a fifth fractionation zone into a stream comprising methylcyclopentane and lighter hydrocarbons and a stream comprising the remainder of the feed to said fifth fractionation zone;
   (t) isomerizing the stream comprising methylcyclopentane and lighter obtained in step "s" to produce a stream comprising a mixed isomerizate;
   (u) separating the isomerizate of step "t" to obtain a stream comprising cyclohexane as a product of the process, a stream comprising isohexane, n-hexane and methylcyclopentane, and a stream comprising a remainder of the products from the said isomerization zone;
   (v) admixing a portion of the second-mentioned stream of step "u" with a portion of said raffinate stream at step "q";
   (w) fractionating at least a portion of the second-mentioned stream of step "s" in a sixth fractionation zone to produce a stream comprising cyclohexane and a stream comprising the remainder of the feed to said sixth fractionation zone;
   (x) withdrawing the first-mentioned stream from step "w" and admixing it with the last-mentioned stream of step "b."

References Cited in the file of this patent
UNITED STATES PATENTS

| | | |
|---|---|---|
| 2,821,561 | Pevere et al. | Jan. 28, 1958 |
| 2,872,492 | Donaldson et al. | Feb. 3, 1959 |